(12) United States Patent
Rao et al.

(10) Patent No.: US 9,467,319 B1
(45) Date of Patent: Oct. 11, 2016

(54) EXPANDING A CAPACITY OF A SINGLE RADIO CHANNEL

(71) Applicant: MOTOROLA SOLUTIONS, INC., Schaumburg, IL (US)

(72) Inventors: Yadunandana N. Rao, Sunrise, FL (US); RaviTeja Chinta, Pompano Beach, FL (US); Charles R. Ruelke, Coral Springs, FL (US); Darrell J. Stogner, Plantation, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/696,413

(22) Filed: Apr. 25, 2015

(51) Int. Cl.
*H04L 27/26* (2006.01)
(52) U.S. Cl.
CPC ................ *H04L 27/2601* (2013.01)
(58) Field of Classification Search
CPC .... H04J 11/003; H04L 25/028; H04L 27/04; H04L 1/0668; H04B 1/0067; H04B 1/0483
USPC ........................ 375/271, 295, 316
See application file for complete search history.

(56) References Cited

U.S. PATENT DOCUMENTS

| | | | |
|---|---|---|---|
| 6,999,523 B2 | 2/2006 | Posti | |
| 7,616,678 B2 | 11/2009 | Cangiani et al. | |
| 7,929,595 B2 | 4/2011 | Mudulodu et al. | |
| 8,396,095 B2 | 3/2013 | Ruegg et al. | |
| 8,619,903 B2 | 12/2013 | Schmidt et al. | |
| 2009/0185545 A1* | 7/2009 | Tarighat-Mehrabani | H04B 1/0067 370/343 |
| 2013/0040689 A1* | 2/2013 | Iwai | H04W 52/16 455/522 |
| 2013/0129005 A1* | 5/2013 | Xia | H04L 1/007 375/295 |
| 2014/0293900 A1* | 10/2014 | Takeda | H04L 5/0073 370/329 |
| 2015/0180690 A1* | 6/2015 | Sahlin | H04L 25/028 375/300 |

FOREIGN PATENT DOCUMENTS

| | | |
|---|---|---|
| AU | 763322 B2 | 7/2003 |
| WO | 2005032022 A1 | 4/2005 |

* cited by examiner

*Primary Examiner* — Freshteh N Aghdam
(74) *Attorney, Agent, or Firm* — Michael Best & Friedrich LLP

(57) ABSTRACT

A method of expanding a capacity of a single radio channel, and a radio. The method includes receiving a primary signal and a secondary signal. The method also includes a transmitter modulating the primary signal and the secondary signal. The method further includes the transmitter scaling a power of the secondary signal below a power of the primary signal to create a power differential. The method also includes the transmitter offsetting a carrier frequency of the secondary signal from a carrier frequency of the primary signal to create a carrier frequency offset. The method further includes the transmitter combining the primary signal and the secondary signal to generate a composite signal. The method also includes the transmitter transmitting the composite signal within the single radio channel via an antenna. The antenna is coupled to the transmitter.

18 Claims, 8 Drawing Sheets

EXPANDING A CAPACITY OF A SINGLE RADIO CHANNEL

BACKGROUND OF THE INVENTION

Generally speaking, data or voice throughput on a single radio channel is limited. For example, a single radio channel is often effectively limited to transmitting one radio signal at a time. Higher data throughput (or capacity) generally requires using more than one radio channel.

Accordingly, there is a need for expanding a capacity of a single radio channel.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
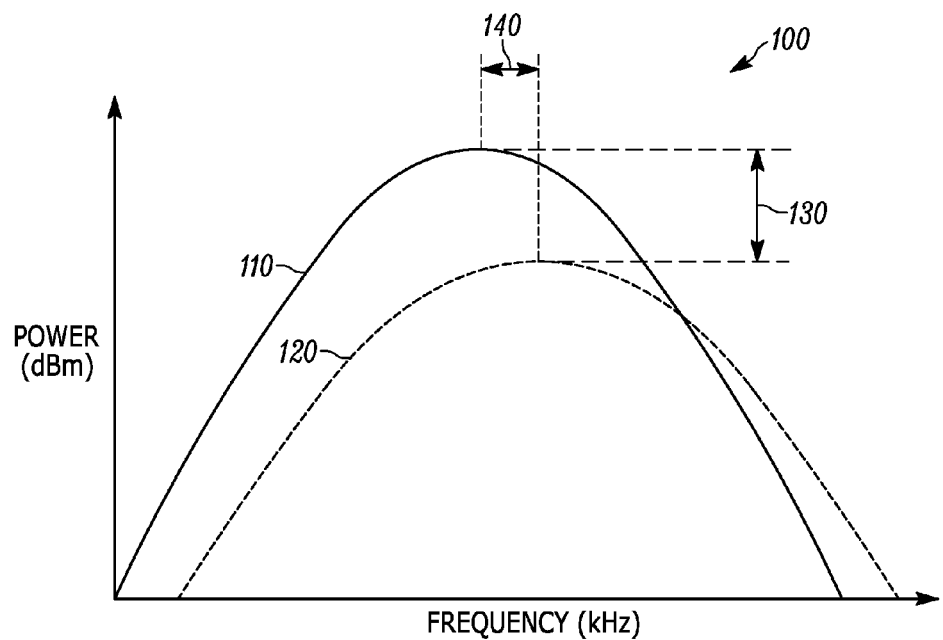
FIG. 1 is a graph of a two signals, co-located within a single radio channel.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some exemplary embodiments include a method of expanding a capacity of a single radio channel. In one embodiment, the method includes a transmitter receiving a primary signal and a secondary signal. The method also includes the transmitter modulating the primary signal and the secondary signal. The method further includes the transmitter scaling a power of the secondary signal below a power of the primary signal to create a power differential between the primary signal and the secondary signal. The method also includes the transmitter offsetting a carrier frequency of the secondary signal from a carrier frequency of the primary signal to create a carrier frequency offset between the primary signal and the secondary signal. The method further includes the transmitter combining the primary signal and the secondary signal to generate a composite signal. The method also includes the transmitter transmitting the composite signal within the single radio channel via an antenna. The antenna is coupled to the transmitter.

Other exemplary embodiments include a radio. In one embodiment, the radio includes a transmitter and an antenna. The transmitter is coupled to the antenna. The transmitter receives a primary signal and a secondary signal. The transmitter also modulates the primary signal and the secondary signal. The transmitter further scales a power of the secondary signal below a power of the primary signal to create a power differential between the primary signal and the secondary signal. The transmitter also offsets a carrier frequency of the secondary signal from a carrier frequency of the primary signal to create a carrier frequency offset between the primary signal and the secondary signal. The transmitter further combines the primary signal and the secondary signal to generate a composite signal. The transmitter also transmits the composite signal within a single radio channel via the antenna.

In telecommunications, the capture effect is a phenomenon, associated with receiving frequency modulated (FM) or phase modulated (PM) signals which is characterized as a ratio between a power of a desired signal and a power of an interference signal (e.g., a noise signal) co-located within a single (i.e., common) radio channel (i.e., spectral bandwidth). When the power ratio of the desired signal to the interference signal exceeds a threshold, only the desired signal will be demodulated. The threshold is determined by the modulation type and parameters of the two signals. This power ratio between the desired signal and the interference signal may vary depending on the modulated information contained within the signals and a carrier frequency offset between the desired signal and the interference signal. In other words, the power difference required for the capture effect to occur depends on the modulation parameters, power levels, carrier frequency offsets, and modulating information of the two signals. For example, if there is no carrier frequency offset between the desired and interference signals, the power ratio necessary to detect the desired signal may be maximized. However, if a large enough carrier frequency offset is introduced (e.g., when the interference signal moves to an adjacent operating channel), both signals can be simultaneously demodulated at the same power level assuming appropriate channel sensitivity.

FIG. 1 is a graph 100 of a desired signal 110 and an interference signal 120. In the graph 100 of FIG. 1, the vertical axis is power in decibel-milliwatts (dBm) and the horizontal axis is frequency in kilohertz (kHz). The desired signal 110 and the interference signal 120 both operate within a single radio channel, but have a power differential 130 and a carrier frequency offset 140 between them. Consequently, an FM receiver that receives both the desired signal 110 and the interference signal 120 will only demodulate the desired signal 110 because it satisfies the conditions for the capture effect. In other words, the FM receiver will only demodulate the desired signal 110 because the desired signal 110 possesses a power differential 130 that exceeds a capture threshold relative to the interference signal 120.

This concept may be exploited to increase (e.g., double) the capacity of a single radio channel by creating a composite signal that includes a primary signal and a secondary signal with a power differential and a carrier frequency offset.

Figure 2A:
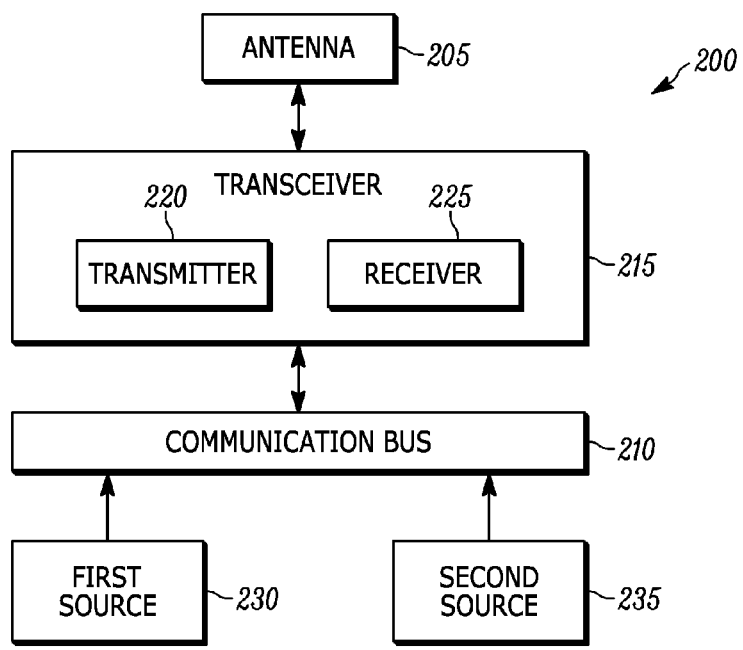
FIG. 2A is a block diagram of a radio, in accordance with some embodiments.
Figure 2B:
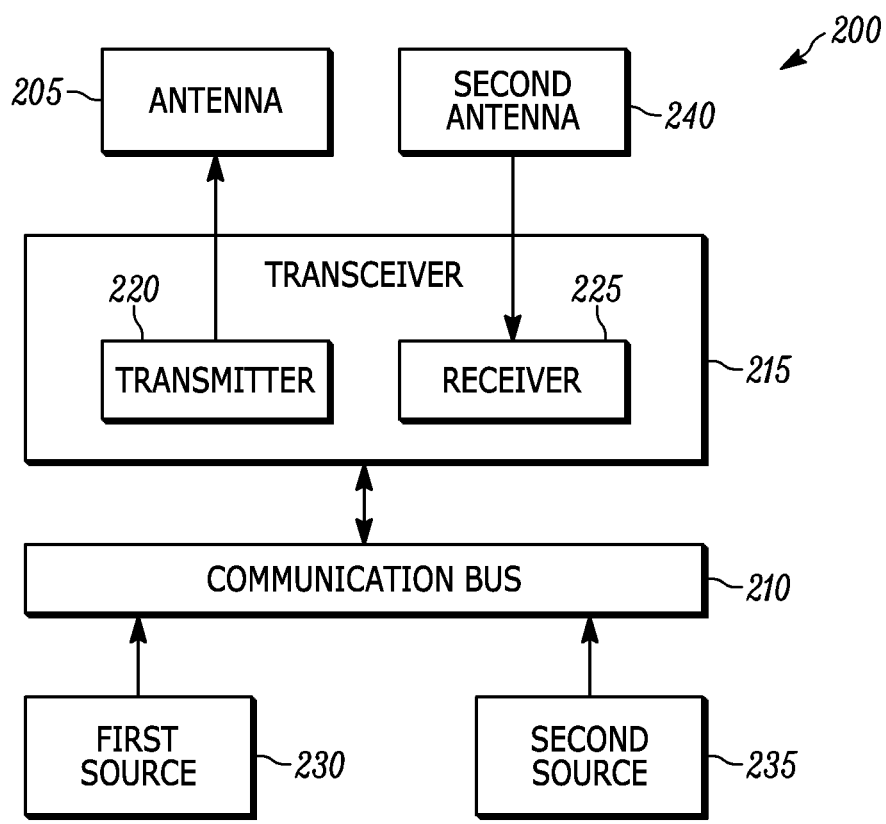
FIG. 2B is a block diagram of a radio, in accordance with some embodiments.

FIGS. 2A and 2B illustrate block diagrams of a radio 200. The radio 200, for example, operates with communication networks. In the embodiment illustrated in FIG. 2A, the radio 200 includes, among other components, an antenna 205, a communication bus 210 (which may be connected to various components within the radio 200), and a transceiver 215. The transceiver 215 includes, among other components, a transmitter 220, and a receiver 225. In some embodiments, the transmitter 220 and the receiver 225 are separate components and not part of a transceiver 215. In some embodiments, the radio 200 does not include a communication bus 210 and instead the components are connected directly to one another.

In the embodiment illustrated in FIG. 2A, the transceiver 215 is coupled to the antenna 205 and the communication bus 210. The transmitter 220 transmits composite signals via the antenna 205. The transmitter 220 generates the composite signals based on primary signals and secondary signals which the transmitter 220 obtains from, for example, a first source 230 and a second source 235, which in the embodiment shown are connected to the communication bus 210. The first source 230 and the second source 235 are, in one embodiment, different sources of data, for example, a source of voice data and a source of non-voice data. In another embodiment, the first source 230 and the second source 235 are constituent components of a single data sequence that has been split into two streams so as to increase a total data throughput of the single radio channel. Example of the types of information that may be carried by the primary and secondary signals include, but are not limited to, a streaming input of data values, data packets, sets of data, voice data, sensor data, system configuration and characterization telemetry, multi-mode state management data, event initiated interrupt processing triggers, or any combination thereof.

As described in the previous paragraph, the radio 200 can generate composite signals for transmission to other radios or devices. The radio 200 may also separately receive a composite signal from another radio or device. In the embodiment shown, the receiver 225 receives radio-frequency (RF) signals modulated with composite signals via the antenna 205. The receiver 225 generates or, in some embodiments, reconstructs primary signals and secondary signals based on the received RF signals that contain modulated information representing the composite signals. The receiver 225 can provide the primary signals and secondary signals to other components in the radio 200. For example, the receiver 225 can derive the primary and secondary signals from the received RF signals and provide the primary and secondary signals to the communication bus 210 to which the other components may be connected.

In some embodiments, the radio 200 operates in a simplex mode. Simplex mode is an operational state where the transmitter 220 and the receiver 225 operate asynchronously and in sequential order. In other words, a transmit event is initiated arbitrarily and the received RF signals may be detected arbitrarily in time. In the simplex mode, a transmit mode and a receive mode occur separately. In the transmit mode, the transmitter 220 is active and the receiver 225 is disabled. In the receive mode, the transmitter 220 is disabled and the receiver 225 is active.

In other embodiments, radio 200 operates in a Time Division Multiplex (TDM) mode. TDM mode is an operational state of deterministically interleaving operating intervals of the transmit mode and the receive mode in time. In other words, the transmitter 220 and the receiver 225 operate within a single radio channel and the transmit mode and the receive mode are segmented into sequential blocks. Each sequential block is assigned a specific time slot such that the transmit mode and the receive mode do not occur at the same time. When operating in TDM mode, the transmitter 220 and receiver 225 operate within a synchronous timing structure. In some embodiments, the synchronous timing structure is controlled by a communication system protocol which governs the radio's communications, as is well-known.

In the embodiment illustrated in FIG. 2B, the radio 200 further includes a second antenna 240. The transmitter 220 is coupled to the antenna 205 and the receiver 225 is coupled to the second antenna 240. Simultaneously, the transmitter 220 can transmit a composite signal within a first single radio channel via the antenna 205 and the receiver 225 can receive a second composite signal within a second single radio channel via the second antenna 240. Coupling the transmitter 220 and the receiver 225 to separate antennas enables the radio 200 to operate in a Frequency Division Multiplex (FDM) mode. In some embodiments, well-known additional RF circuitry including, among other components, a duplexer that enables simultaneous transmit and receive operation utilizing a single antenna. FDM mode is an operation state that facilitates simultaneous transmit and receive operations over separate radio channels. In other words, active transmit and receive radio channels may be spectrally separated by multiple in-active intervening channels as dictated by the requirements of a communication system. This configuration facilitates tandem receive/transmit operation that can include a "full duplex" talk-listen mode of communication. Accordingly, it should be apparent to those skilled in the art, that embodiments are adaptable to simplex operations, TDM operations, and FDM operations without departing from the novel elements described herein. Each transmitter radio channel and receiver radio channel can operate using a single composite signal that includes multiple signals embedded within the single composite signal. The composite signal that is associated with the transmitter and/or receiver can be structured to conform to the governing protocol (e.g., simplex, TDM, FDM, etc.) of any given FM or PM communication system. By incorporating this composite signaling strategy into a given communication system, the effective spectral utilization may be doubled, thereby increasing the spectral efficiency of the communication system.

Figure 3:
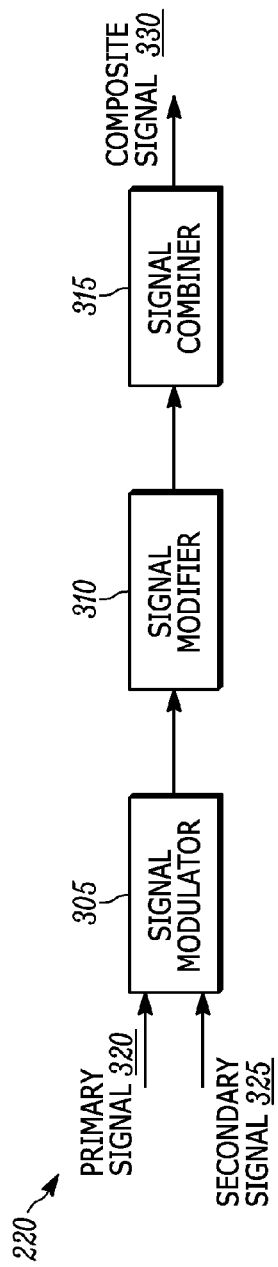
FIG. 3 is a block diagram of a transmitter, in accordance with some embodiments.

FIG. 3 is a block diagram of the transmitter 220. In the embodiment illustrated in FIG. 3, the transmitter 220 includes, among other components, a signal modulator 305, a signal modifier 310, and a signal combiner 315.

The signal modulator 305 receives a primary signal 320 and a secondary signal 325, e.g., from the communication bus 210. In some embodiments, the first source 230 produces the primary signal 320 and the second source 235 produces the secondary signal 325. In other embodiments, the first source 230 produces the secondary signal 325 and the second source 235 produces the primary signal 320. The signal modulator 305 modulates the primary signal 320 and the secondary signal 325 using a frequency-based or phase-based modulation scheme. Frequency-based modulation schemes include, but are not limited to, frequency-shift keying, multiple frequency-shift keying, and legacy continuous-time analog FM. Phase-based modulation schemes include, but are not limited to, phase-shift keying and continuous phase modulation. In some embodiments, the signal modulator 305 modulates the primary signal 320 and the secondary signal 325 using the same modulation scheme. In other embodiments, the signal modulator 305 modulates the primary signal 320 and the secondary signal 325 using the different modulation schemes.

The signal modifier 310 receives modulated signals representing the primary signal 320 and secondary signal 325 from the signal modulator 305. The signal modifier 310 scales a power (i.e., amplitude) of the secondary signal 325 to be less than a power of the primary signal 320. This reduction in the power of the secondary signal 325 creates a power differential between the primary signal 320 and the secondary signal 325. The signal modifier 310 may also offset a carrier frequency of the secondary signal 325 from a carrier frequency of the primary signal 320 to create a carrier frequency offset between the primary signal 320 and the secondary signal 325. In some embodiments, the signal modifier 310 also alters the power and the carrier frequency of the primary signal 320. In some embodiments, the radio 200 includes a separate signal modulator 305 and signal modifier 310 for the primary signal 320 and the secondary signal 325. In some embodiments, the signal modulator 305 and the signal modifier 310 are combined.

The signal combiner 315 receives the modified signals representing the primary signal 320 and the secondary signal 325 from the signal modifier 310. The signal combiner 315 generates a composite signal 330 by combining the modified signals representing the primary signal 320 and the secondary signal 325.

Figure 4:
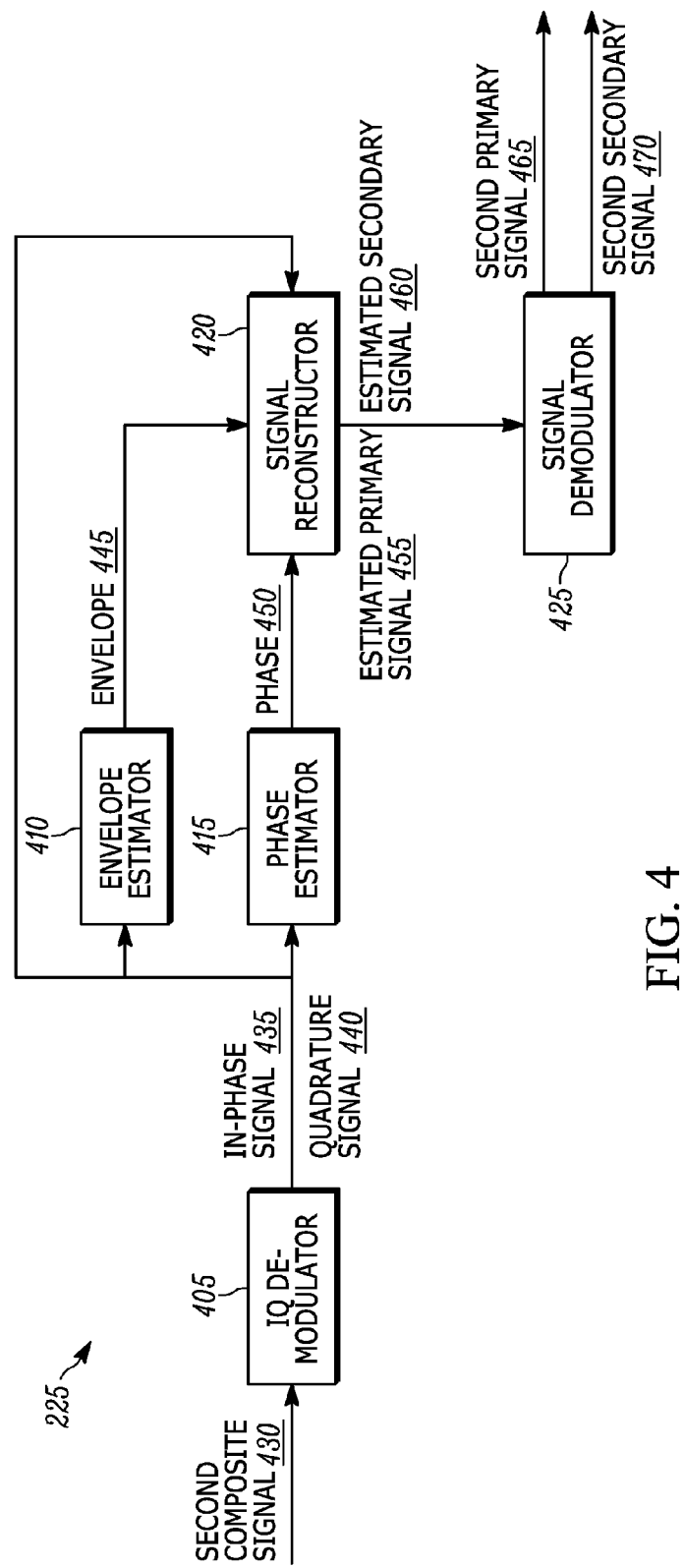
FIG. 4 is a block diagram of a receiver, in accordance with some embodiments.

FIG. 4 is a block diagram of the receiver 225. In the embodiment illustrated in FIG. 4, the receiver 225 includes, among other components, an In-phase/Quadrature (IQ) demodulator 405, an envelope estimator 410, a phase estimator 415, a signal generator or, more particularly, a signal reconstructor 420, and a signal demodulator 425.

In some embodiments, the IQ demodulator 405 includes a complex mixer (not shown) that converts a second composite signal 430 into its constituent in-phase component (i.e., in-phase signal 435) and quadrature-phase component (i.e., quadrature signal 440). The quadrature signal 440 is related to the in-phase signal 435 of the second composite signal 430 by a phase shift of approximately 90 degrees. In some embodiments, the in-phase signal 435 and quadrature signal 440 are generated by means of a complex down mixing process wherein the second composite signal 430 is combined with a local oscillator (LO) signal composed of constituent in-phase and quadrature-phase LO signaling pairs. The resultant output signals from the complex mixer correspond to the in-phase signal 435 and the quadrature signal 440, which are subsequently processed in accordance with the description outlined herein. By this or other well-known processes, the IQ demodulator 405 receives the second composite signal 430 and derives the in-phase signal 435 and the quadrature signal 440 from the second composite signal 430. The in-phase signal 435 and quadrature signal 440 are subsequently processed by the envelope estimator 410, the phase estimator 415, and signal reconstructor 420.

The second composite signal 430 includes, among other components, a transmitted composite signal sent by another radio and radio channel impairments such as can be introduced during the communication process. Minimization of the radio channel impairments is part of the radio communication system design requirements. The second composite signal 430 is proximate to transmitted composite signal when the radio channel impairments are minimal. The second composite signal 430 may be represented according to the following equation:

$$S_{composite} = I_{composite} + j \cdot Q_{composite},$$

wherein
$S_{composite}$ = second composite signal 430,
$I_{composite}$ = In-phase signal 435, and
j = square root of −1, and
$Q_{composite}$ = quadrature signal 440.

The envelope estimator 410 determines an envelope 445 for the second composite signal 430 based on the in-phase signal 435 and the quadrature signal 440. In some embodiments, the envelope estimator 410 determines the envelope 445 according to the following equation:

$$\alpha = SQRT(I_{composite}^2 + Q_{composite}^2)$$

wherein
α = envelope 445, and
SQRT( ) = square root of the ( ) quantity.

In some embodiments, the envelope estimator 410 applies a low-pass filter (not shown) to the envelope 445 in which case α, defined above, is the post-low-pass-filter (port-LPF) signal.

The phase estimator 415 determines a phase 450 for the second composite signal 430 based on the in-phase signal 435 and the quadrature signal 440. In some embodiments, the phase estimator 415 determines the phase 450 for the second composite signal 430 according to the following equation:

$$\psi = ARCTAN(Q_{composite}/I_{composite}),$$

wherein ψ = phase 450.

The signal reconstructor 420 receives the envelope 445 and the phase 450 of the second composite signal 430. The signal reconstructor 420 determines an estimated primary signal 455 based on the envelope 445 and the phase 450 of the second composite signal 430. In some embodiments, the signal reconstructor 420 determines the estimated primary signal 455 according to the follow equation:

$$S_{primary} = \alpha \cdot COS(\psi) + j \cdot \alpha \cdot SIN(\psi),$$

wherein $S_{primary}$ = estimated primary signal 455.
The estimated primary signal 455 may also be represented in complex form according to the following equation:

$$S_{primary} = I_{primary} + j \cdot Q_{primary},$$

wherein
$I_{primary}$ = in-phase component of $S_{primary}$, and
$Q_{primary}$ = quadrature component of $S_{primary}$.

The signal reconstructor 420 also receives the in-phase signal 435 and the quadrature signal 440, representing the second composite signal 430. The signal reconstructor 420 subsequently determines an estimated secondary signal 460 derived from the second composite signal 430 and the estimated primary signal 455, previously generated by the signal reconstructor 420. In some embodiments, the signal reconstructor 420 determines the estimated secondary signal 460 by subtracting the estimated primary signal 455 from the second composite signal 430 according to the following equation:

$$S_{secondary} = (I_{composite} - I_{primary}) + j \cdot (Q_{composite} - Q_{primary}),$$

wherein $S_{secondary}$ = estimated secondary signal 460.

While certain embodiments delineated herein represent the primary and secondary signals by means of their constituent quadrature component representations, it should be apparent to those skilled in the art that the primary and secondary quadrature components may be combined into a single real-time domain signal representation for subsequent processing. Alternatively, the primary and secondary signals may be represented by their quadrature elements for subsequent processing.

The signal demodulator 425 demodulates both the estimated primary signal 455 and the estimated secondary signal 460 using a frequency-based or phase-based modulation scheme. The signal demodulator 425 outputs a second primary signal 465 and a second secondary signal 470 (i.e., demodulated signals), e.g., using the communication bus 210. In some embodiments, the signal demodulator 425 demodulates the estimated primary signal 455 and the estimated secondary signal 460 using the same modulation scheme. In other embodiments, the signal demodulator 425 demodulates the estimated primary signal 455 and the estimated secondary signal 460 using the different modulation schemes.

Figure 5:
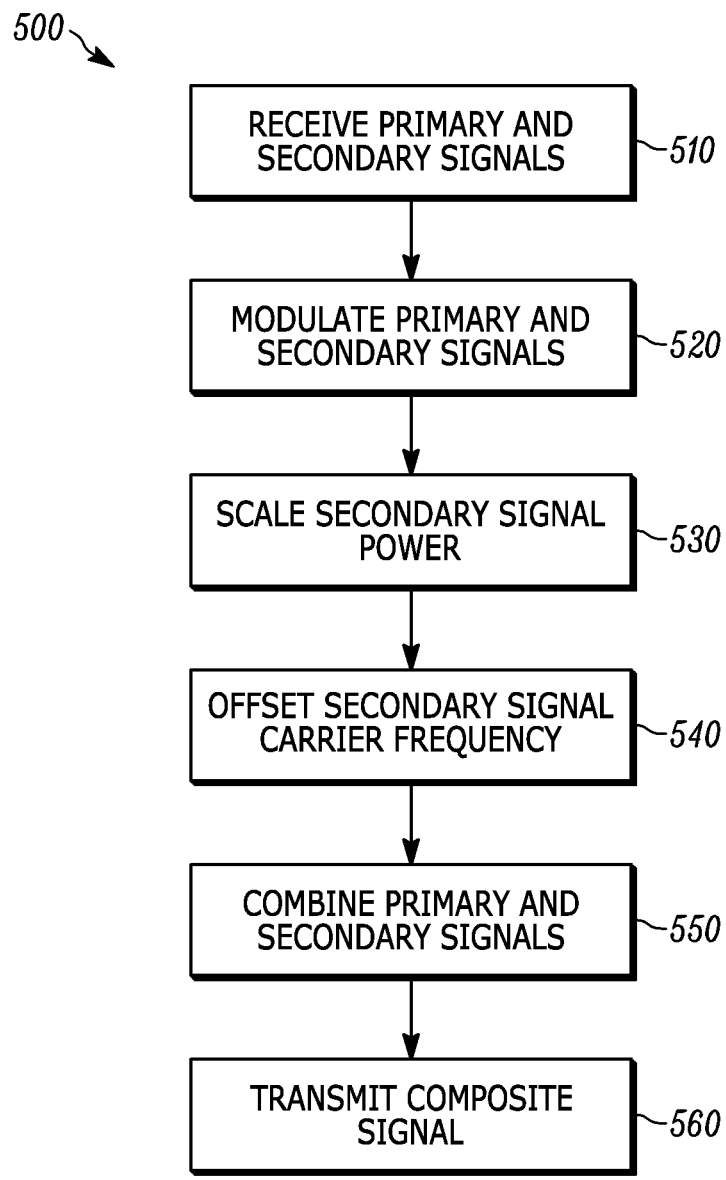
FIG. 5 is flowchart of a method of generating a composite signal, in accordance with some embodiments.

FIG. 5 illustrates a process or method 500 of generating composite signals for the purpose of expanding a capacity of a single radio channel. The steps of the method 500 are described in a serial manner for descriptive purposes. Various steps described herein with respect to the method 500 are capable of being executed simultaneously, in parallel, or in an order that differs from the illustrated serial manner of execution. At step 510, the transmitter 220 receives a primary signal 320 and a secondary signal 325, e.g., from the communication bus 210. At step 520, the transmitter 220 modulates the primary signal 320 and the secondary signal 325 using a frequency-based or phase-based modulation scheme. At step 530, the transmitter 220 scales a power of the secondary signal 325 to create a power differential between a power of the primary signal 320 and the power of the secondary signal 325. At step 540, the transmitter 220 offsets a carrier frequency of the secondary signal 325 to create a carrier frequency offset between a carrier frequency of the primary signal 320 and the carrier frequency of the secondary signal 325. At step 550, the transmitter 220 combines the primary signal 320 and the secondary signal 325 to create the composite signal 330. At step 560, the transmitter 220 transmits the composite signal 330 via the antenna 205 within the single radio channel. In some embodiments, the method 500 terminates after step 560 is complete. In other implementations, the method 500 proceeds to step 510 to receive a new primary and secondary signals.

Figure 6:
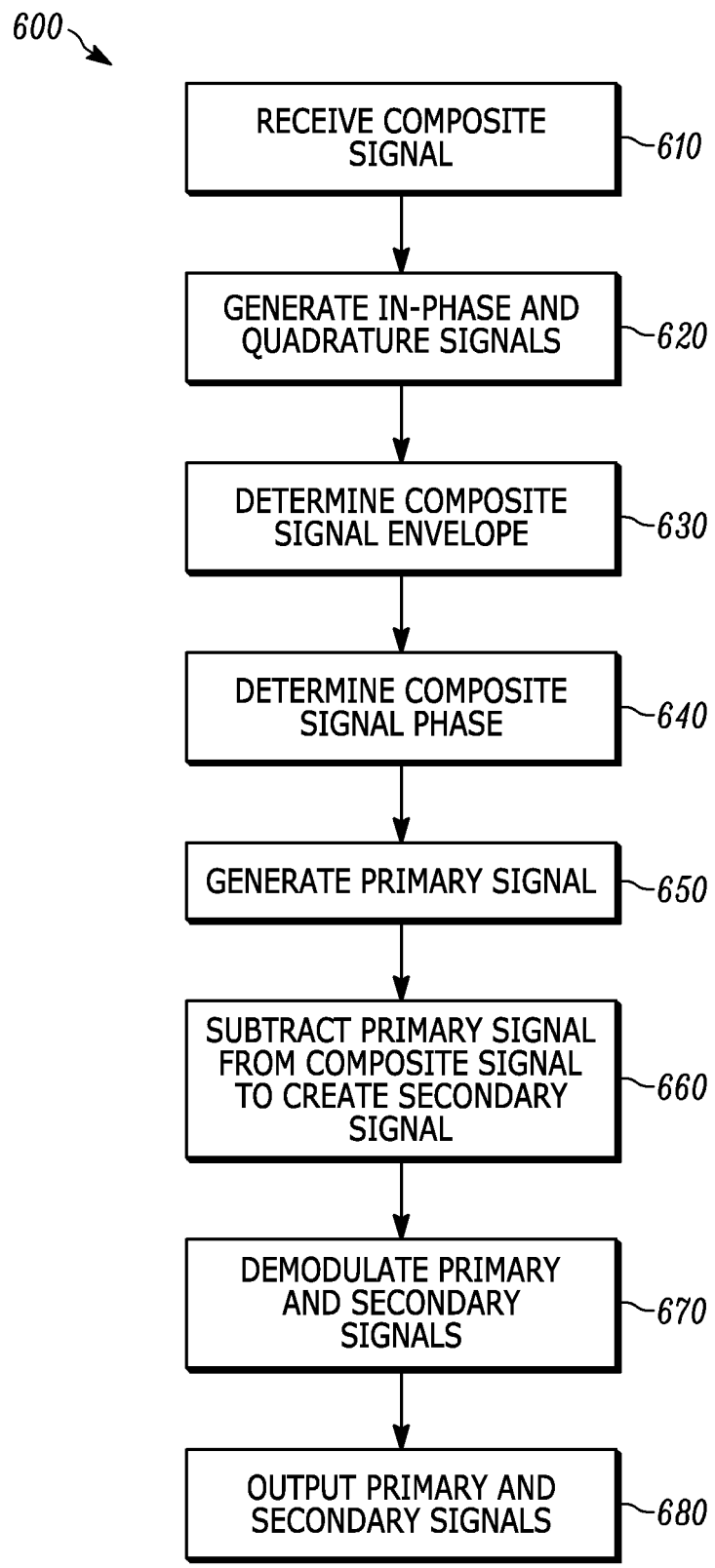
FIG. 6 is flowchart of a method of generating a primary signal and a secondary signal from a composite signal, in accordance with some embodiments.

FIG. 6 illustrates a process or method 600 of generating primary and secondary signals from received composite signals for the purpose of expanding a capacity of a single radio channel. The steps of the method 600 are described in a serial manner for descriptive purposes. Various steps described herein with respect to the method 600 are capable of being executed simultaneously, in parallel, or in an order that differs from the illustrated serial manner of execution. At step 610, the receiver 225 receives a second composite signal 430 within a single radio channel. In some embodiments, the receiver 225 receives the second composite signal 430 via the antenna 205. In other embodiments, the receiver 225 receives the second composite signal 430 via the second antenna 240. At step 620, the receiver 225 generates an in-phase signal 435 and a quadrature signal 440 using the second composite signal 430. At step 630, the receiver 225 determines an envelope 445 for the second composite signal 430 using the in-phase signal 435 and the quadrature signal 440. At step 640, the receiver 225 determines a phase 450 for the second composite signal 430 using the in-phase signal 435 and the quadrature signal 440. At step 650, the receiver 225 generates an estimated primary signal 455 based on the envelope 445 and the phase 450 for the second composite signal 430. At step 660, the receiver 225 subtracts the estimated primary signal 455 from the second composite signal 430 to generate the estimated secondary signal 460. At step 670, the receiver 225 demodulates the estimated primary signal 455 and the estimated secondary signal 460. At step 680, the receiver 225 outputs or provides a second primary signal 465 and a second secondary signal 470, e.g., using the communication bus 210. In some embodiments, the method 600 terminates after step 680 is complete. In other implementations, the method 600 returns to step 610 to process a new composite signal.

Figure 7:
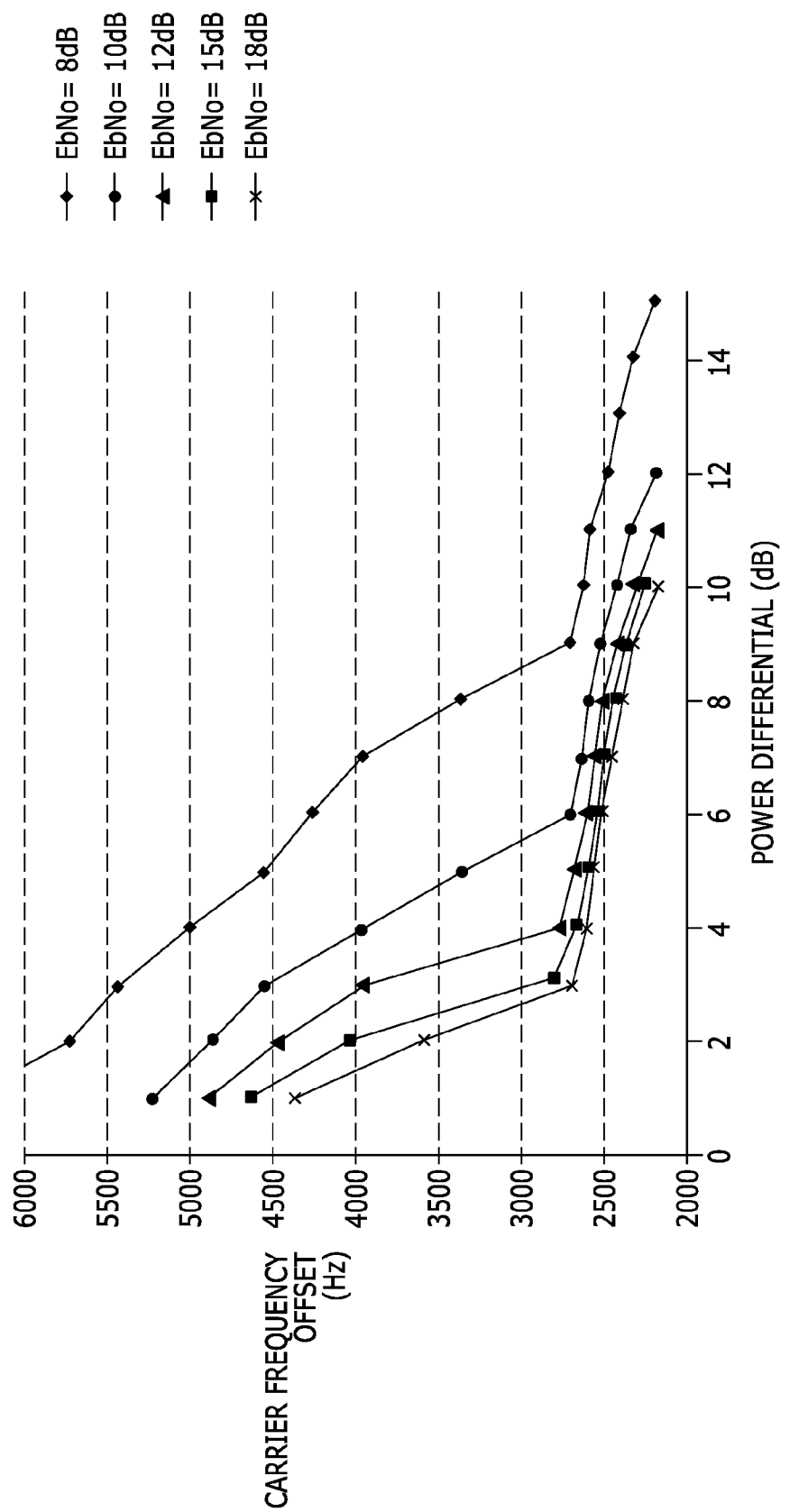
FIG. 7 is a graph of the relationship between power differentials and frequency separations for a primary signal.

As described above, a power differential and carrier frequency offset between the primary signal 320 and the secondary signal 325 are necessary, but can vary in magnitude based on particular design requirements. In some embodiments, the power differential between the primary signal 320 and the secondary signal 325 is 10 decibels (dB) and the carrier frequency offset between the primary signal 320 and the secondary signal 325 is 4 kHz. A relationship exists between power differential and carrier frequency offset that can be identified to accomplish the desired goal of facilitating differentiation between two signals co-located within a common radio channel. FIG. 7 illustrates exemplary combinations of power differentials and frequency separations that result in an approximately 5% bit error rate (BER) for different energy-per-bit to noise power spectral density ratios (EbNo's) of the primary signal 320. The BER is a fraction of bits in error of the total number of bits. EbNo is a ratio of signal power to noise power. EbNo is generally approximated as being proportional to an inverse of the square root of a distance that an RF signal travels from a transmitting radio to a receiving radio. For example, generally speaking, the EbNo is reduced as the distance between the transmitting radio and the receiving radio increases.

This intrinsic reduction in EbNo at longer distances may be mitigated in part by increasing the carrier frequency offset between the primary signal 320 and the secondary signal 325, thereby providing for greater signal differentiation within the composite signal 330. Conversely, if a transmitting radio is communicating with the receiving radio over a shorter range, where the EbNo is higher, the power differential between the primary signal 320 and secondary signal 325 can be reduced for a given carrier frequency offset to accommodate a target performance level.

Figure 8:
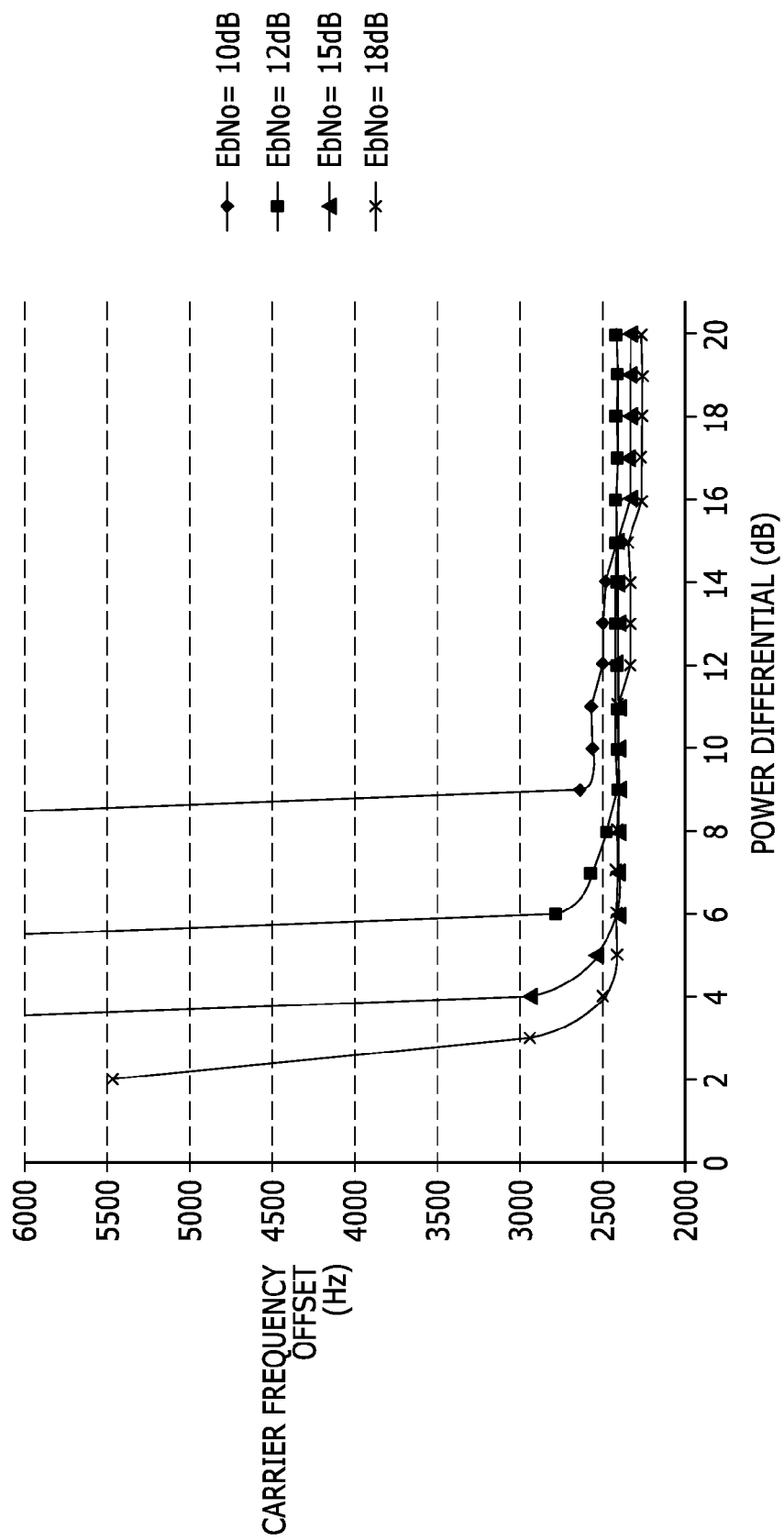
FIG. 8 is a graph of the relationship between power differentials and frequency separations for a secondary signal.

FIG. 8 illustrates exemplary combinations of power differentials and frequency separations that result in an approximately 5% BER for different EbNo's of the secondary signal 325. Generally speaking, there is a critical value of power differential for each EbNo below which the carrier frequency offset needs to increase rapidly for equivalent performance. In the graphs of FIGS. 7 and 8, the horizontal axis is power differential in dB and the vertical axis is carrier frequency offset in hertz (Hz).

In some embodiments, the power differential and the carrier frequency offset are selected based on the configuration of a radio system. The transmission range of the secondary signal 325 is based in part on the power differential. The transmission range of the secondary signal 325, relative to the primary signal 320, decreases as the power differential increases. Therefore, the transmission range of the secondary signal 325 is less than the transmission range of the primary signal 320. In a radio system, each radio is configured to operate within a set transmission range.

Figure 9:
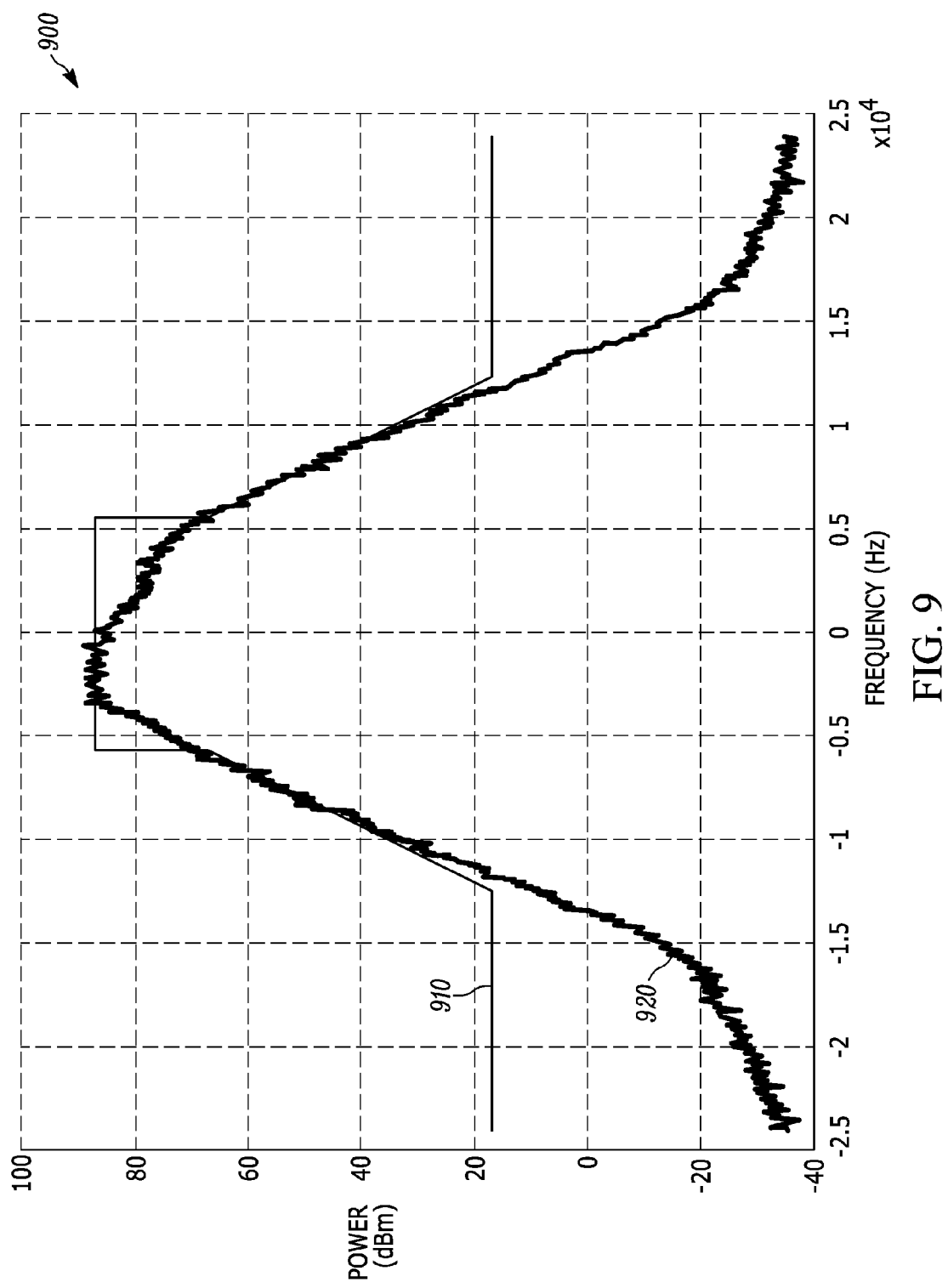
FIG. 9 is graph of a composite signal.

The Federal Communication Commission (FCC) regulates the bandwidth and channel spacing for transmitting signals, including narrowband (i.e., 12.5 kilohertz) and wideband (i.e., 25 kilohertz) signals. FIG. 9 illustrates a graph 900 of an FCC-mandated narrowband mask 910 that is required for certain narrowband radio signals operated within a single narrowband radio channel in the United States of America. In the graph 900 of FIG. 9, the vertical axis is power in dBm and the horizontal axis is frequency in hertz. FIG. 9 also illustrates a narrowband composite signal 920 transmitted by the radio 200, in accordance with some embodiments. The narrowband composite signal 920 is a composite representation of a primary signal 320 and a secondary signal 325 which are co-located within a single narrowband radio channel. Generally speaking, the narrowband composite signal 920 is required to fit within the FCC-mandated narrowband mask 910. In some embodiments, the power differential and carrier frequency offset are selected such that the composite signal complies with FCC regulations. FCC regulations vary across different systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of expanding a capacity of a single radio channel, the method comprising:
receiving, at a transmitter, a primary signal and a secondary signal;
modulating, at the transmitter, the primary signal and the secondary signal to create a modulated primary signal and a modulated secondary signal;
creating a power differential between the modulated primary signal and the modulated secondary signal by scaling, at the transmitter, a power of the modulated secondary signal below a power of the modulated primary signal;
creating, based at least on the power differential, a carrier frequency offset between the modulated primary signal and the modulated secondary signal by offsetting, at the transmitter, a carrier frequency of the modulated secondary signal from a carrier frequency of the modulated primary signal;

combining, at the transmitter, the modulated primary signal and the modulated secondary signal as modified by the power differential and the carrier frequency offset to generate a composite signal; and transmitting, at the transmitter, the composite signal within the single radio channel via an antenna coupled to the transmitter.

2. The method of claim 1, further comprising:

receiving, at a receiver, a second composite signal;

generating, at the receiver, an estimated primary signal based on the second composite signal;

subtracting, at the receiver, the estimated primary signal from the second composite signal to generate an estimated secondary signal; and demodulating, at the receiver, the estimated primary signal and the estimated secondary signal to generate a second primary signal and a second secondary signal.

3. The method of claim 2, wherein the estimated primary signal and the estimated secondary signal are demodulated using at least one demodulation scheme selected from a group consisting of frequency demodulation and phase demodulation.

4. The method of claim 2, wherein generating the estimated primary signal from the second composite signal includes:

determining, at the receiver, a phase of the second composite signal; and determining, at the receiver, an envelope of the second composite signal.

5. The method of claim 2, wherein the receiver receives the second composite signal within one selected from a group consisting of the single radio channel and a second single radio channel via a second antenna coupled to the receiver.

6. The method of claim 2, wherein the receiver is coupled to the antenna, wherein the receiver receives the second composite signal within the single radio channel via the antenna.

7. The method of claim 6, wherein the transmitter transmits the composite signal and the receiver receives the second composite signal asynchronously.

8. The method of claim 1, wherein the primary signal and the secondary signal are modulated using at least one modulation scheme selected from a group consisting of frequency modulation and phase modulation.

9. The method of claim 1, wherein the single radio channel is a narrowband radio channel.

10. A radio comprising:

an antenna; and a transmitter coupled to the antenna, wherein the transmitter:

receives a primary signal and a secondary signal, modulates the primary signal and the secondary signal to create a modulate primary signal and a modulated secondary signal, scales a power of the modulated secondary signal below a power of the modulated primary signal to create a power differential between the modulated primary signal and the modulated secondary signal, creates a carrier frequency offset based at least in part on the power differential by offsetting a carrier frequency of the modulated secondary signal from a carrier frequency of the modulated primary signal to create the carrier frequency offset between the modulated primary signal and the modulated secondary signal, combines the modulated primary signal and the modulated secondary signal as modified by the power differential and the carrier frequency offset to generate a composite signal, and transmits the composite signal within a single radio channel via the antenna.

11. The radio of claim 10, further comprising:

a receiver, wherein the receiver:

receives a second composite signal, generates an estimated primary signal based on the second composite signal, subtracts the estimated primary signal from the second composite signal to generate an estimated secondary signal, and demodulates the estimated primary signal and the estimated secondary signal to generate a second primary signal and a second secondary signal.

12. The radio of claim 11, wherein the receiver demodulates the estimated primary signal and the estimated secondary signal using at least one demodulation scheme selected from a group consisting of frequency demodulation and phase demodulation.

13. The radio of claim 11, wherein the receiver generates the estimated primary signal from the second composite signal includes determining a phase of the second composite signal; and determining an envelope of the second composite signal.

14. The radio of claim 11, further comprising a second antenna coupled to the receiver, wherein the receiver receives the second composite signal within one selected from a group consisting of the single radio channel and a second single radio channel via the second antenna.

15. The radio of claim 11, wherein the receiver is coupled to the antenna, wherein the receiver receives the second composite signal within the single radio channel via the antenna.

16. The radio of claim 15, wherein the transmitter transmits the composite signal and the receiver receives the second composite signal asynchronously.

17. The radio of claim 10, wherein the transmitter modulates the primary signal and the secondary signal using at least one modulation scheme selected from a group consisting of frequency modulation and phase modulation.

18. The radio of claim 10, wherein the single radio channel is a narrowband radio channel.

* * * * *